(12) United States Patent
Kailash et al.

(10) Patent No.: US 8,549,581 B1
(45) Date of Patent: Oct. 1, 2013

(54) DISTRIBUTED NETWORK SECURITY SYSTEM DEPLOYING GUARD TABLES

(75) Inventors: Kailash Kailash, San Jose, CA (US); Jose Raphel, Austin, TX (US)

(73) Assignee: Zscaler, Inc., San Jose, CA (US)

( * ) Notice: Subject to any disclaimer, the term of this patent is extended or adjusted under 35 U.S.C. 154(b) by 1342 days.

(21) Appl. No.: 12/128,506

(22) Filed: May 28, 2008

(51) Int. Cl.
*G06F 7/04* (2006.01)

(52) U.S. Cl.
USPC ............. 726/3; 726/1; 726/8; 726/22; 726/24

(58) Field of Classification Search
USPC .......................................................... 726/3
See application file for complete search history.

(56) References Cited

U.S. PATENT DOCUMENTS

| | | | |
|---|---|---|---|
| 7,096,493 B1* | 8/2006 | Liu ..................................... | 726/8 |
| 8,024,471 B2* | 9/2011 | Sinclair et al. ................. | 709/229 |
| 8,141,147 B2* | 3/2012 | Sinclair et al. .................. | 726/22 |
| 8,185,510 B2* | 5/2012 | Chaudhry et al. ............. | 707/705 |
| 8,250,081 B2* | 8/2012 | Nash ............................. | 707/754 |
| 2001/0027492 A1* | 10/2001 | Gupta ............................. | 709/245 |
| 2002/0053035 A1* | 5/2002 | Schutzer ........................ | 713/202 |
| 2007/0028303 A1* | 2/2007 | Brennan ........................ | 726/24 |
| 2007/0028304 A1* | 2/2007 | Brennan ........................ | 726/24 |
| 2007/0260602 A1* | 11/2007 | Taylor ............................. | 707/6 |
| 2008/0071903 A1* | 3/2008 | Schuba et al. ................. | 709/224 |
| 2008/0109871 A1* | 5/2008 | Jacobs ............................. | 726/1 |
| 2010/0217771 A1* | 8/2010 | Nash ............................. | 707/769 |

\* cited by examiner

*Primary Examiner* — Kambiz Zand
*Assistant Examiner* — Yonas Bayou
(74) *Attorney, Agent, or Firm* — Clements Bernard PLLC; Laurence A. Baratta, Jr.; Christopher L. Bernard

(57) ABSTRACT

Guard tables including absence information are used in a security system to limit the processing of negative queries. A key corresponding to a request to access a network resource is hashed and the output of the hash is a bit position in a guard table. The bit value at the bit position in the guard table is checked to determine if the information to which the key corresponds is absent from a datastore. Further processing of the request can be based on the indicated presence or absence information.

22 Claims, 8 Drawing Sheets

DISTRIBUTED NETWORK SECURITY SYSTEM DEPLOYING GUARD TABLES

BACKGROUND

This disclosure relates to network security.

The prevalence and accessibility of computer networks requires security measures to protect valuable information. Such security measures include a user and password login in which a user provides login credentials (e.g., a user identifier, a password, and perhaps other information) proving that the user is authorized to access one or more systems, scanning files stored in networked devices for malicious software, and generally monitoring network transmissions to detect and halt unauthorized and/or malicious network activity.

For a security system that is serving a large enterprise, implementing these security measures can introduce processing and/or transmission delays. Limiting such delays is desirable to the extent that the delays can be limited without compromising security. Network security measures often search lookup tables, databases, or other types of datastores to perform a comparison operation to verify that a given network activity is authorized and/or non-malicious. Datastores are often optimized in order to speed the retrieval of stored information, but these optimizations generally do not reduce processing times where an operation attempts to find information not included in the stored data. Such operations can introduce undesirable delays in network security system processing.

SUMMARY

The subject matter described in this specification includes systems and methods for limiting the use of central processing unit (CPU) and network resources to search for information not stored in a datastore being queried. A guard table includes a hash indicative of the presence (and absence) of information that is, for example, stored in a datastore. Requests for access to network resources that would conventionally be processed by querying a datastore for information can be processed by first checking a guard table to determine if the datastore includes the queried for information. Further processing can be based on the presence/absence indication provided by the guard table.

In general, one aspect of the subject matter described in this specification can be embodied in methods that include the actions of hashing a plurality of keys derived from a respective plurality of records of a datastore, where the output of the hashing function is a plurality of bit positions, setting a plurality of bits at the bit positions in a guard table, sending the guard table to a plurality of processing nodes, storing the guard table at the plurality of processing nodes, receiving a request to access a network resource at a processing node, identifying a request key from the request, hashing the request key with the hashing function, wherein the output of the hashing function is a candidate bit position, determining a value at the candidate bit position in the guard table of the processing node, and processing the data access request based on the determined value at the candidate bit position.

One or more of the following advantages can be realized by implementations of the subject matter described herein. Processing of queries for information absent from network datastores can be limited. Limiting such queries can reduce processor loads, improve processing times, and improve a user interaction experience. Processing nodes can be protected from denial of service attacks using non-existent URLs and forcing classification of URLs based on the request uniform resource identifier (URI).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
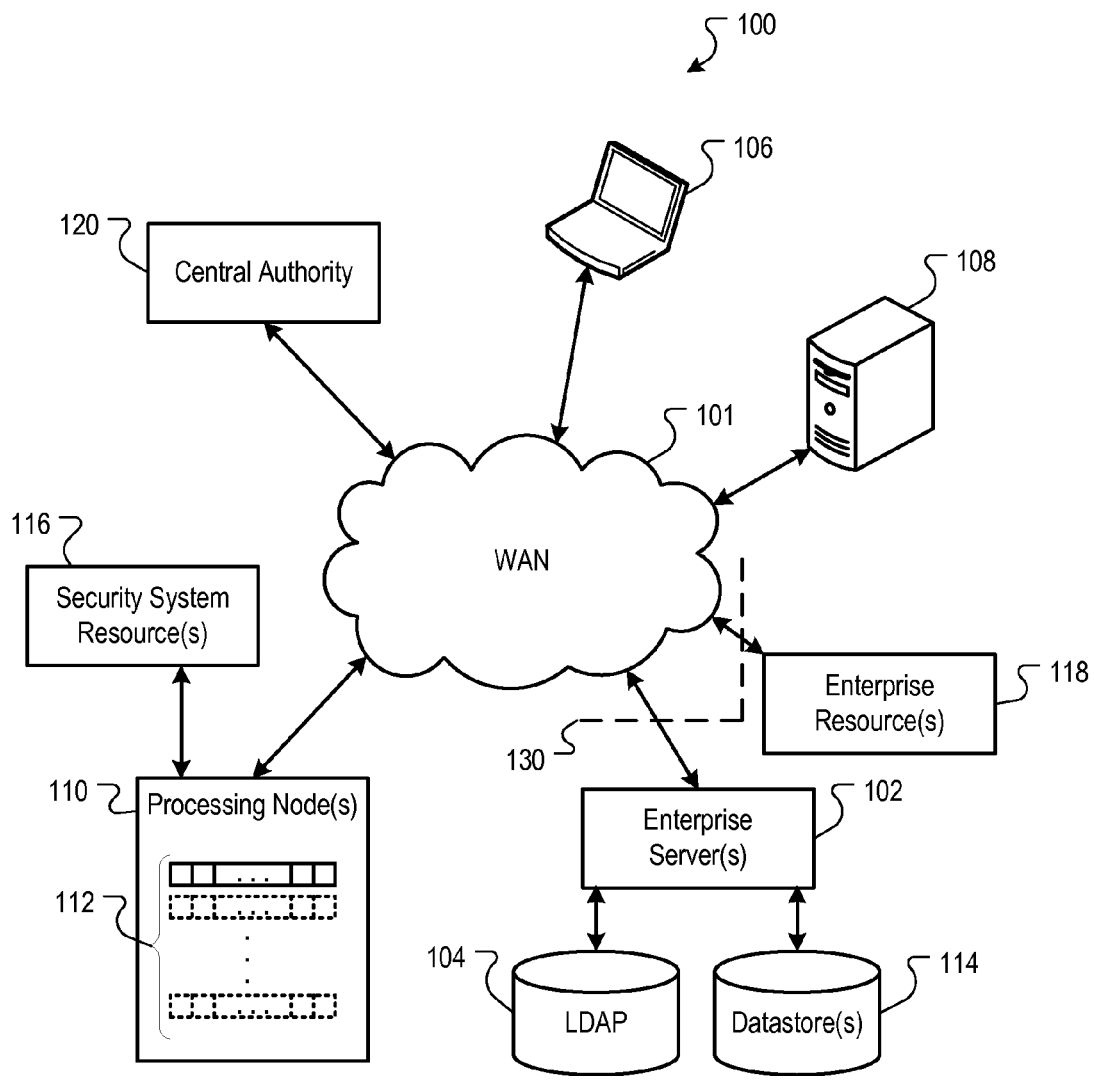
FIG. 1 is a block diagram of an example network environment of a security system using guard tables.

FIG. 1 is a block diagram of an example network environment 100 of a security system using guard tables. A wide area network (WAN) 101, such as the Internet, or some other combination of wired and/or wireless networks, connects, in data communication, one or more enterprise servers 102, user devices 106 and 108, a processing node 110, and a central authority system 120.

The enterprise server 102 can, for example, include one or more servers associated with an enterprise, e.g., network servers for a company. The enterprise server 102 can communicate with the WAN through one or more network devices, such as a router, a gateway, etc. The enterprise server 102 can access a lightweight directory access protocol (LDAP) device, such as an LDAP server, for example. The LDAP server 104 can store user login credentials, which can include, for example, user identifiers and login passwords. Other sensitive and/or confidential information can be stored in the LDAP server 104.

In some implementations, security features that protect the enterprise server 102 are provided by one or more processing node(s) 110 and a central authority device 120. For example, the entity that owns the enterprise server 102, e.g., a company, may contract with a distributed security provider that provides one or more processing nodes 110 and the central authority system 120. The processing nodes 110 are devices that are used to implement security operations, such as login processing, virus scanning, traffic monitoring, etc. These security operations can be performed by security system resource(s) 116. The security system resource(s) 116 can be included in the processing nodes 110 or in separate servers. Example processing nodes can include server computer devices. The enterprise's security policy may be enforced and implemented through a central authority device 120. In some implementations, the central authority system 120 can include a server farm that is in data communication with the processing node(s) 110 and can provide data to the processing node(s) 110. In some implementations, the central authority server 120 and processing nodes 110 can be external to a network edge 130 of the enterprise server(s) 102.

The data provided by the central authority system 120 can include one or more guard tables 112 that can be stored at the processing nodes 110. The guard table 112 can include a hash index of, for example, user credentials that are stored in the LDAP device 104. In some implementations, the guard table can be a Bloom filter with k=1, i.e., a Bloom filter implemented by a single hash function. The processing node 110 can, for example, use information in a guard table including a hash index for user credentials to quickly determine the presence and/or absence of login credentials in the LDAP device 104 for corresponding login attempts at the user device 106 by a fast lookup in the guard table 112. The guard table(s) 112 can also be used to perform fast lookups prior to performing operations that would, for example, access datastore(s) 114, or use security system resource(s) 116 (e.g., network bandwidth, security data, and/or processes running on one or more processing nodes or security system servers, such as a virus scanner, and/or a URL filter), or enterprise resource(s) 118 (e.g., network bandwidth, and/or processes running on one or more enterprise servers such as a virus scanner and/or a URL filter). Details regarding the use of a guard table having a hash index of user credentials and further uses of guard tables are provided below.

Processing nodes 110 and other network security devices (e.g., the central authority 120) can be realized by instructions that upon execution cause one or more processing devices to carry out the processes and functions described in this specification. Such instructions can, for example, include interpreted instructions, such as script instructions, e.g., JavaScript or ECMAScript instructions, executable code, or other instructions stored in a computer readable medium.

Guard Tables

A guard table 112 stored at a processing node can be used to enhance the performance of information lookup queries through the use of presence information. Presence of information can be represented in a guard table using one bit per item of information. For example, a guard table can include an array of bits that can be accessed using an index value indicating a bit position in the guard table array. Each bit in the guard table can represent the presence or absence of the information item corresponding to that bit.

The guard table can be used as the first stage of an information lookup procedure. For example, a guard table can be used as a front end to databases of enterprise names, user names, passwords, URLs, and any other information protected by a network security system. Information items can be mapped to index values of the guard table by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Given a hash function $H:S \to N$ accepting a sequence of bytes (S) and outputting a number (N), a particular sequence s in the set S, and a particular n is in the set N, T is a table (e.g., a table, such as guard table 112, with a single row, an array) of zeros and ones, that guards a database D which is a potential store for information s, such that the $n^{th}$ bit of T being zero indicates that s is not in the database D (e.g. LDAP server 104 and/or datastores 114). That is, if the value of T[n] (table T at index n) equals zero the sequence s is not in the database D. Failure to locate the information in T can affirmatively indicate the absence of the information in D without the need to perform the operations to read the database D (e.g., perform a lookup of the LDAP server 104 and/or the datastore(s) 114). Hashing an information key and checking a bit value at an array index output by the hashing function generally requires less processing time than actually searching D to determine if the information is present.

Overview of Guard Table Use in Network Security

In a network security system, further processing of a network operation can be conditioned on the value at an indicated bit position in a guard table. For example, if a check of the guard table 112 indicates an absence of the data corresponding to a hashed user identifier, further processing of a corresponding login attempt can be avoided.

The use of guard tables 112 in a network security system can improve the failure query (i.e., responding to a request for absent information) performance of database queries and/or any general information queries. Information lookup data structures are generally optimized to access information that is present in the structures and little attention is given to the case of information lookup failures. Failure query performance has a greater effect on the time required to process information searches for very rarely occurring items (e.g., the presence of file information in a virus scan log or a cache where many or most of the files transferred in a network have not been scanned or cached). Guard tables provide a mechanism to improve the performance of failure queries without adversely affecting the performance of success queries. Typically, using a guard table, the worst case additional cost is only on the order of one, and thus its use for most failure queries saves on the order of m log m, where m is the number of information records present.

Failure queries in large information bases pose a number of problems. For example, such queries can be used in denial of service attacks. Other instances where the use of a guard table can prove beneficial generally include queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents.

Typically, information is looked up using index structures that are indexed on their primary key, either using a hash or a tree based index. The worst case results for such queries occur for queries in which the information does not exist in the information base. For example, for a hash based indexing scheme, the information lookup cost is that of the worst case collision. Similarly for index trees, the worst case tree traversal cost is that of traversing to a key value that does not exist. The failure cases have an access time of the order of m log m, where m is the number of information records present.

Additionally, where index structures optimized for positive information retrieval are used, as the number of records increases, managing storage in the memory becomes an issue. As an example, consider a system with a large user base of 10 million users with each index entry of 512 bytes. The amount of information used for storing the index information is 5 GB. When the system is scaled with a larger number of users, it is not possible to store the index information in main memory (e.g., transistor-based random access memory) and the alternative is to fetch the user information from disk storage. The latency of main memory is of the order of tens of nanoseconds, while that of the disk storage is of the order of tens of milliseconds. Query processing will slow down the system by an order of millions if the storage is accessed often.

A guard table representing negative information complements databases that capture positive information. Guard tables are sparse (i.e., the tables include many zeros and few ones), and can eliminate false negatives which are, for example, instances where an information key is hashed to a bit position and that bit position indicates that the requested information is absent when it is actually present. False positives are possible, however, due to hash collisions.

General Methods and Systems of Guard Table Use in Network Security

Figure 2:
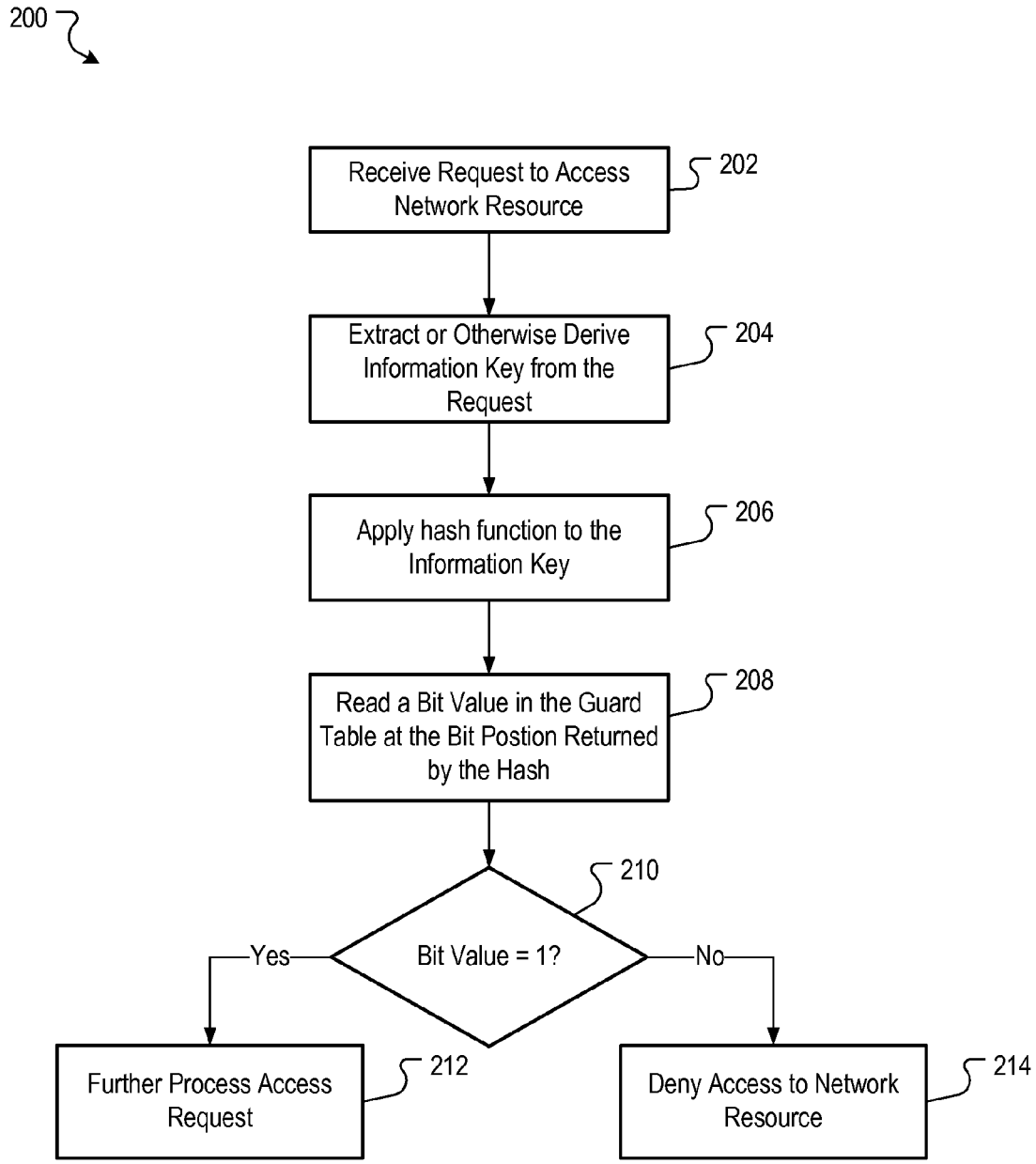
FIG. 2 is a flowchart of an example method for using a guard table in a network security application.

FIG. 2 is a flowchart of an example method 200 for using a guard table in a network security application. The example method is described with reference to a system implementing the method. At stage 202 the system receives a request to access protected network resources. For example, a processing node (e.g., node 110) of a network security system receives a login request. The system extracts or otherwise derives an information key from the request (204). For example, a user identifier can be used as the information key for a login request, one or more properties of a file to be transferred can be used as the information key for a file transfer request, and a URL can be used at the information key for an Internet access request. The system applies a hash function to the information key to obtain a bit position (206). The system reads a bit value in the guard table protecting the network resource (the resource to which access is being requested) (208). If the bit value is one (210) the system further processes the access request (212) (e.g., allowing the processing of a login request). Otherwise, access is denied (214) (e.g., the login request is not processed).

Figure 3:
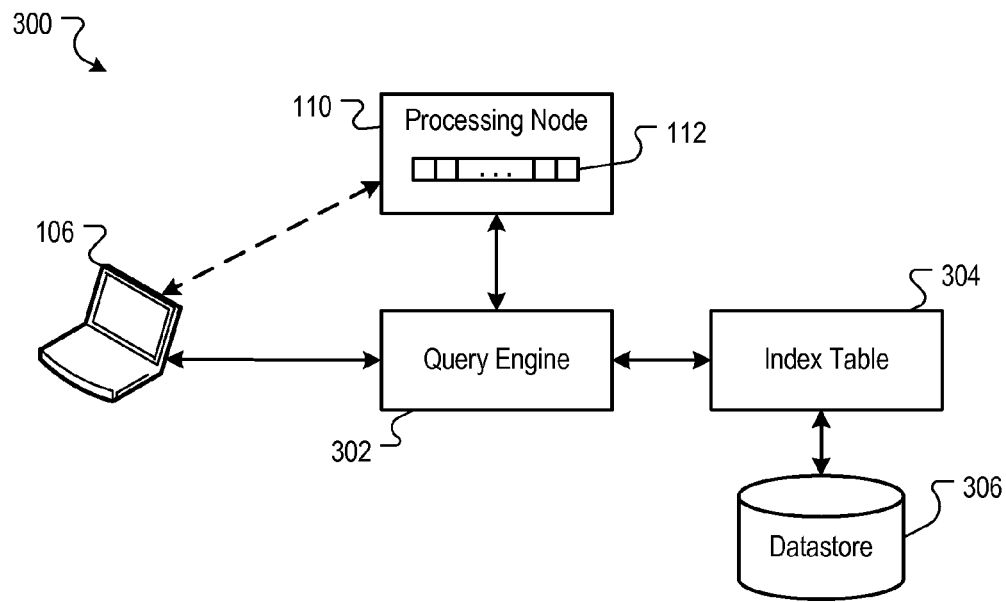
FIG. 3 is a block diagram of a system using a guard table to protect access to a datastore.

FIG. 3 is a block diagram of a system 300 using a guard table to protect access to a datastore 306. An attempt from the computer device 106 to access the query engine 302 to query the datastore 306 is routed to the processing node 110 that includes a guard table 112 having a hash index indicating the presence of information stored in the datastore 306. The guard table for the datastore is created by starting with an empty table (e.g., all bits are zero) and hashing a context specific key for records stored in the datastore. Bits at bit positions returned by the hash function are set to 1 to indicate that the datastore includes information corresponding to the hashed key.

Requests can be forwarded to the processing node 110 by the query engine 302, sent directed to the processing node 110, or sent to the processing node through, for example, a proxy relationship. Before an information lookup is performed on the datastore, the processing node 110 first looks at the guard table 112. Each information item in the datastore 306 is represented by a bit position in the guard table. The processing node 110 extracts and/or derives an information key from the request, and hashes that key using the same hash function used to create the guard table 112. If the bit in that bit position is zero, then no further processing is needed, as the information is not present in the system. If the bit is non-zero, however, it is likely that the information is present in the database, but false positives are possible due to hash collisions. In cases where the bit is non-zero, a lookup of the datastore 306 is performed using, for example, an index table 304 optimized for lookup performance for positive queries (i.e., queries where the requested information is included in the datastore). False positives are not significantly detrimental to the performance of the system since selection of an appropriate hash function and table size makes collisions infrequent.

Performance of a guard table depends on the properties of the hashing function (index generation function). The collision property of hashing functions does not significantly affect the performance of the lookup if the collisions are not biased to key (such as with a mod function, for example). Hash functions that generally distribute values evenly across the hash space can minimize collisions. CRC hash functions that have less collision possibilities such as CRC64 are generally good for representing absence information, as is an MD5 hash function which has good collision properties.

A general algorithm for information lookup for a datastore protected by a guard table T, such as guard table 112 for example, and information addition (to update a guard table T) is:

| | |
|---|---|
| Lookup:: key → value | // to lookup a value based on a key |
| h ← hash(key); | // hash the key to obtain a table index |
| if (bitpos(T, h) == 0) | // if the bit at the table index is zero then |
| value ← none; | |
| | // the sought for value is not present in |
| | // the datastore |
| else value ← | // else lookup the value in the datastore |
| index_lookup(h,key); | |
| | // using the key |
| Add::key, value | // to add presence information to a |
| | // guard table using an information key |
| h ← hash(key); | // hash the key to obtain a table index h |
| bitset(bitpos(T, h), 1); | // set the bit at the table index h to 1 |
| index_add(h,key,value); | // update the conventional index |

Figure 4:
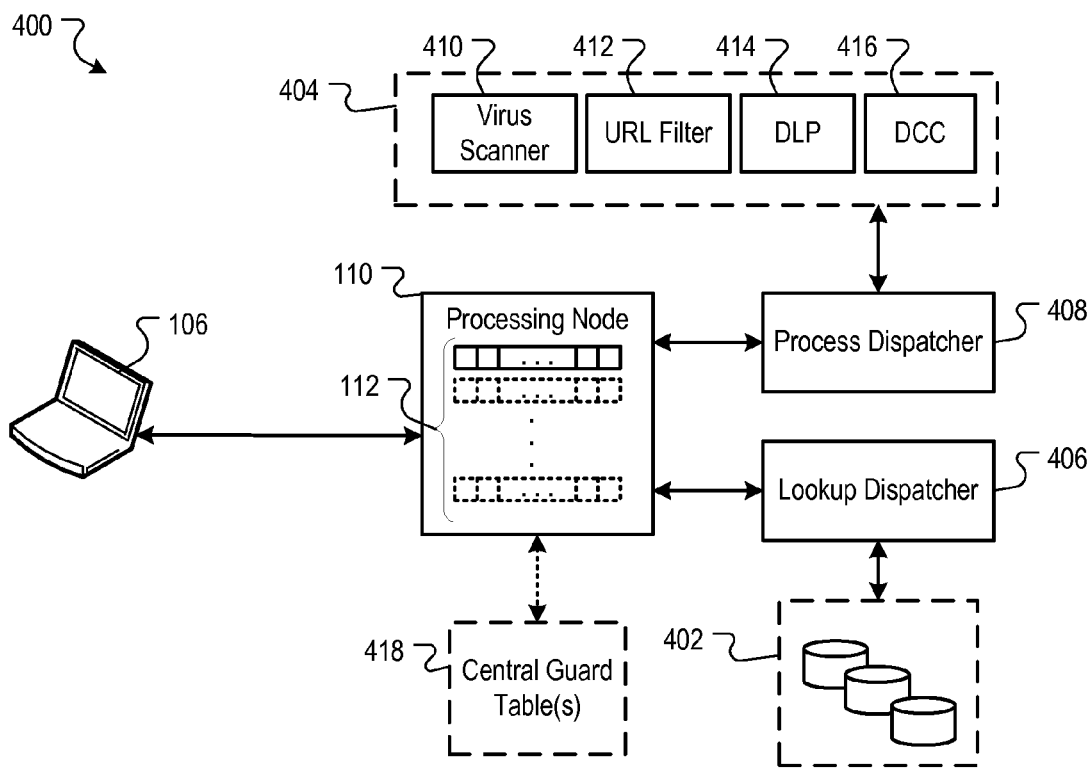
FIG. 4 is a block diagram of a system using one or more guard tables to protect access to datastores and processes.

FIG. 4 is a block diagram of a system 400 using one or more guard tables 112 to protect access to datastores 402 and processes 404. The processing node 110 includes one or more guard tables 112 that indicate the presence or absence of information in the datastores 402. The datastores 402 can include, for example, information logs or other records corresponding to one or more of the processes 404. The processes can include, for example, a virus scanner 410, a network URL filter 412, a data leakage protection (DLP) process 414, and a dynamic content classification (DCC) process 416. In some implementations, guard tables for a number of processing nodes are stored at a central location as central guard tables 418.

Information stored in the datastores 402 can include, for example, threat data. The threat data can, for example, include the classifications of content items according to threat classifications, e.g., a list of known viruses, a list of known malware sites, spam e-mail domains, etc.

Content items such as web pages, files, email messages, or other data or communications for transmission on a network can be classified using the processes 404. The results of prior classifications can be stored (cached, for example) in the datastores 402 as the threat data so that the results can be referred to upon the content item again being encountered by the processing node 110. Content items can be classified as, for example, clean, malware, unauthorized or undesirable content, innocuous, unknown, etc. The processing node 110 can use the threat data to, for example, allow distribution of the content item, preclude distribution of the content item, allow distribution of the content item after a cleaning process, or perform threat detection on the content item.

The action taken for a given content item by a processing node 110 can be based on, for example, a security policy distributed to the processing node 110 by a central authority system 120. The security policy can be defined by policy data stored in the datastores 402. Example policy data can define access privileges for users, web sites and/or content that is disallowed, restricted domains, etc. The authority nodes 120 can distribute the policy data to the access nodes 110. In some implementations, the central authority system 120 can distribute threat data and/or the policy data to one or more processing nodes 110. For example, the central authority 120 can provide a list of known viruses, malware sites, spam email domains, etc., and the security actions to be taken as defined by the policy data.

The processing node 110, upon receiving a request to access or otherwise utilize network resources, determines the type of request that has been received. For example, the processing device determines whether the request is an information lookup request, a request for a web page at a given URL, a request for cached network information, a file transfer request, etc. The processing node 110 then accesses a guard table 112 corresponding to the request. In some implementations, separate guard tables 112 are maintained for each type of access request. In other implementations, a single table is used for different types of requests.

A check of the guard table for presence information is performed, and depending on the result of the guard table check, the processing node can send the request to a lookup dispatcher 406 or a process dispatcher 408. The lookup dispatcher 406 can, for example, receive query requests and perform corresponding information lookup processes on the datastores 402. For example, if the guard table indicates that the requested information is present in a datastore to be queried, the processing node further processes the request by, for example, sending the request to the lookup dispatcher 406. If the guard table 112 indicates that the information is not present in the datastore, further processing can be avoided, for example, or the processing node can forward the request to the process dispatcher 408 for further processing. The process dispatcher 408 can, for example, initiate one or more processing operations of the processes 404.

In some implementations, a request type identifier can be use to modify an information key prior to a key being hashed in order to limit key interference. For example, a login request can have "login" appended to the user identifier used as the key (e.g., johnlogin), and this resulting string can be hashed to obtain a bit position in a combined guard table that protects user login information as well as queries of a datastore. This would prevent, for example, a database query for records corresponding to "john" from interfering with the user identifier "john". A database query having an information key "John" can have, for example, "query" (or some other string) appended prior to hashing.

In some implementations, the one or more guard tables 112 are organized hierarchically with each hierarchical level having a different hash function. For example, if the first level hash table gives a zero, then no further check is done. If the first level has table is 1, then the second level hash table is accessed with the second hash function, etc. For example, a three level table can be used with CRC64, MD5 and Checksum as the indexing mechanisms.

In some implementations, The processing node 110 uses the one or more guard tables 112 to store indications of the presence of information for virus scan status for a given file, URL scan status, logged in users, cached information, etc. For example, a guard table can be used to reduce queries of virus scan records to search for records corresponding to a file that has not yet been scanned; reduce queries of network filter records for records corresponding to content that has not previously been scanned; reduce queries of user identification records for spurious login attempts; and reduce cache searches for information that has not been cached.

Example of Enhancing Network Virus Scanning Using a Guard Table

Figure 5:
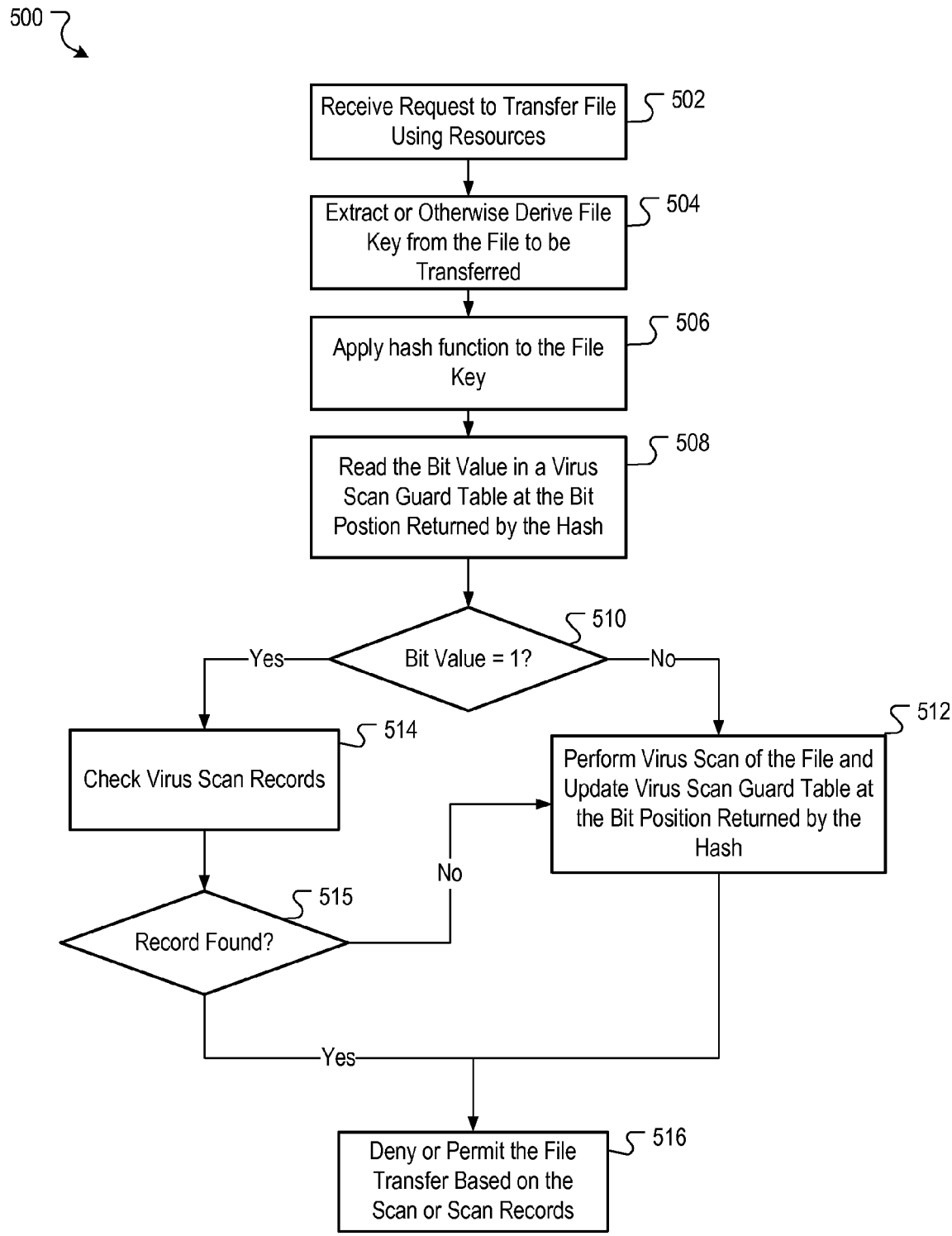
FIG. 5 is a flowchart of an example method for using a guard table to enhance virus scanning of files transferred over a network.

FIG. 5 is a flowchart of an example method 500 for using a guard table to enhance virus scanning of files transferred over a network. The process 500 can, for example, be implemented at a processing node 110.

A request to transfer a file using network resources is received (e.g., a request to download a file from the Internet, upload to a file to the network, send a file to a recipient on the network, and/or receive a file at the network) (502). For example, a processing node 110 can receive a request to deliver an email message to an enterprise system user that includes a file attachment.

A file key corresponding to the request is extracted or otherwise derived from the file to be transferred (504). The file key can be, for example, a file characteristic (e.g., a filename, a file size, a file checksum, etc.), or combination of two or more file characteristics. For example, a processing node 110 can combine a file size and checksum of the file attached to the email to generate the file key.

A hash function is applied to the file key to obtain a table bit position for a guard table (506). For example, a processing node 110 can hash the file key to generate an integer bit position.

A bit value in a guard table is checked at the returned bit position to determine if the file to which the key corresponds has previously been scanned for viruses (508). The guard table can include presence/absence information as to whether a virus scan for a given file has been previously performed. For example, the processing node can determine the value at a bit position of a guard table 112.

If the bit value is zero (510) then the security system has not previously performed a virus scan of the file. The file is scanned for viruses and the virus scan guard table is updated to set the bit at the bit position returned by the hash to one to indicate that the file has been scanned (512). For example, a processing node 110 can set the bit in a guard table 112 at the bit position returned by the hash function to a one.

The file transfer request is denied or permitted based on the outcome of the virus scan (516). For example, the processing node 110 can permit the email with the file attachment to be delivered to the enterprise recipient if the virus scan indicates that the file is virus-free, and can block delivery of the email if the file is virus infected.

If the bit value is non-zero (i.e., one for a binary system), (510) virus scan records (e.g., logs and/or other test records that include results of previous network threat detection tests) are checked to determine if the file was found to contain a virus during the previous scan (514). For example, a processing node 110 can search virus scan logs to find records that correspond to the file attachment. Since it is possible for a false positive to occur, there may be no record of the file having previously been scanned. If there is not a record corresponding to the file (515), the file is scanned for viruses and the guard table is updated (512). For example, a processing node 110 can initiate a virus scan of the file attachment and set a bit in a guard table 112 at the bit position returned by the hash function to a one.

If a virus scan record is found, the file transfer is denied or permitted based on the virus status of the file as indicated by the record (516). For example, the processing node 110 can permit the email with the file attachment to be delivered to the enterprise recipient if the virus scan indicates that the file is virus-free, and can block delivery of the email if the file is virus infected. The method 500, significantly reduces searches of the virus scan records for information that is not present in the virus scan records.

Example of Enhancing a Network Filter Using a Guard Table

Figure 6:
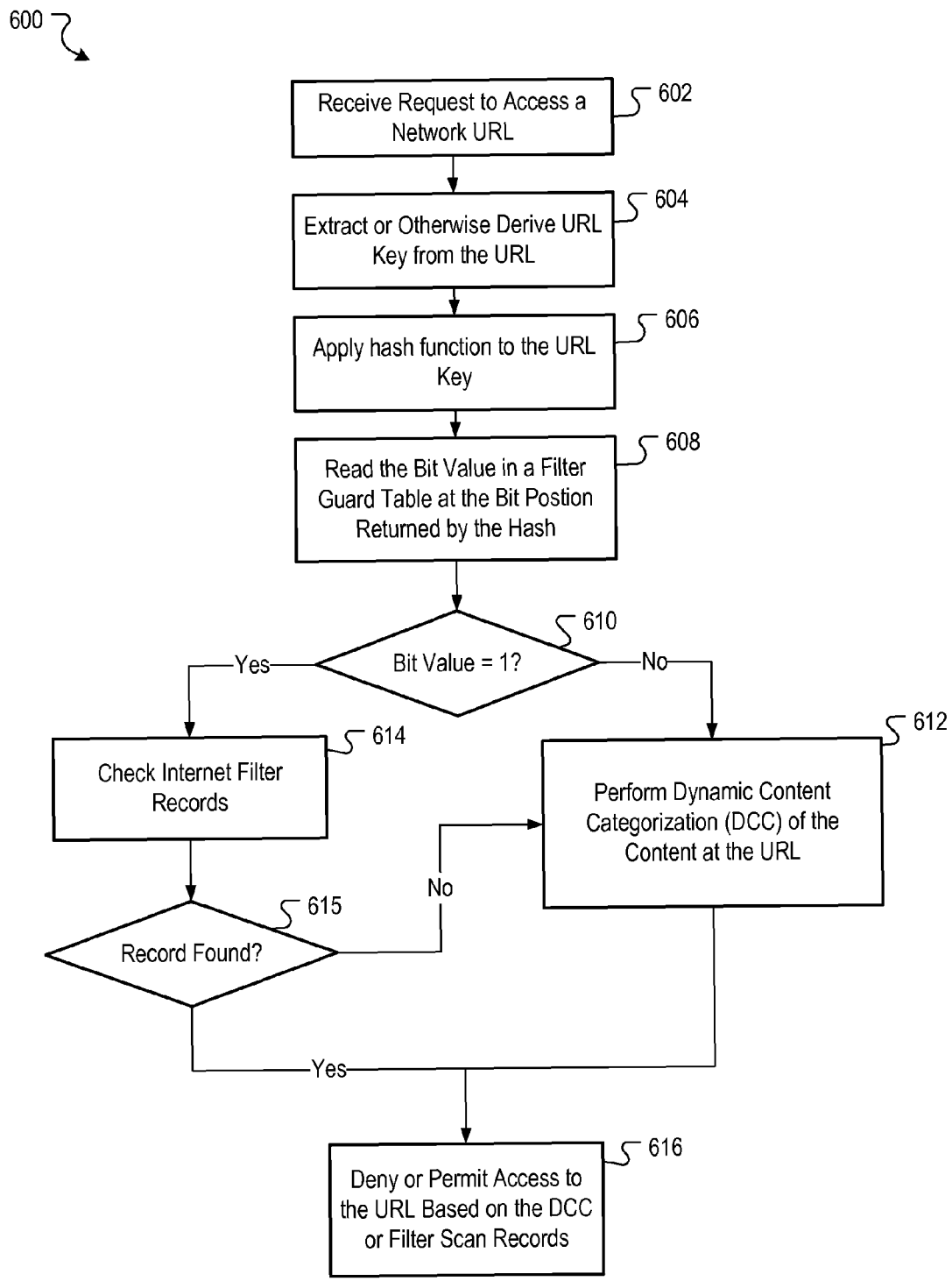
FIG. 6 is a flowchart of an example method for using a guard table to enhance network content filtering.

FIG. 6 is a flowchart of an example method 600 for using a guard table to enhance network content filtering. The method 600 can be used in a processing node 110, for example. The method 600 is described with reference to a URL, but the method is also applicable to other network location identifiers such as, for example, an IP address.

A request to access a URL using network resources (e.g., access a web page) is received (602). For example, a processing node 110 can receive a request from an enterprise system user to access content at www.example.com.

A URL key corresponding to the request is extracted or otherwise derived from the URL (604). For example, the entire URL can be used as a key, or for domain based filtering, the domain of the URL can be used as the key.

A hash function is applied to the file key to obtain a table bit position for a filter guard table (606). For example, a processing node 110 can hash the URL key to generate an integer bit position.

A bit value at the returned bit position is checked in a guard table to determine if the URL to which the key corresponds has previously been scanned for appropriateness (e.g., to determine if the URL should be blocked for pornographic material, and/or to implement one or more child filters) (608). The guard table can include presence/absence information as to whether the content at the URL has previously been scanned. For example, the processing node can determine the value at a bit position of a guard table 112.

If the bit value is zero (610), then the security system has not previously performed a scan of the content at the URL. A dynamic content categorization of the content at the URL can be performed to check, for example, for appropriateness of the content (612). The filter guard table can be updated to set the bit at the bit position returned by the hash to one to indicate that the content at the URL has been scanned. For example, a processing node 110 can set the bit in a guard table 112 at the bit position returned by the hash function to a one.

The URL access is denied or permitted based on the outcome of the dynamic content categorization (616). For example, the processing node 110 can permit the enterprise user to access www.example.com if the content categorization does not detect any inappropriate content, and can deny access to the content if inappropriate content is detected.

If the bit value is non-zero (610) (i.e., one for a binary system), URL filter scan records (e.g., logs, cached logs, and/or other test records that include results of previous network threat detection tests) are checked to determine if the URL was found to have inappropriate content during the previous scan (614). Since it is possible for a false positive to occur, there may be no record of the content having previously been scanned. If there is not a record corresponding to the URL (615), the content at the URL is scanned for appropriateness and the guard table is updated (612). For example, a processing node 110 can initiate a scan of the content at www.example.com and set a bit in a guard table 112 at the bit position returned by the hash function to a one.

If a content scan record is found for the URL, the URL access is denied or permitted based on the status of the URL content as indicated by the record (616). For example, the processing node 110 can permit the content at the URL to be accessed if the no inappropriate content is detected by the scan, and can block delivery of the content if inappropriate material is detected. The method 600 significantly reduces searches of the filter scan records for information that is not present in the filter scan records.

Protecting Against Denial of Service Attacks Using a Guard Table

In some implementations, guard tables 112 are used to protect network resources from denial of service attacks, such as distributed denial of service attacks. A network security systems can use a guard table of type T as described above to protect login information, such as login information for one or more enterprise servers. In some implementations, a network security system can protect network resources for multiple enterprises (e.g., companies). The network security system can, for example, use a guard table for company names and another guard table for user names, where the login name is composed of company name and user name. A zero bit in the guard table can indicate absence of information in the underlying database.

Enterprises with large a large number of users that can log into the system require large amount of storage space for storing user credentials. As previously described, when enterprise systems are scaled such that it becomes impractical or impossible to store the user credential information for the user base in main memory (e.g., transistor based random access memory), the general alternative is to fetch the user information from disk storage. Due to the high latency of disk accesses, login request processing will slow down the system significantly where disk accesses are required. This creates an opportunity to attack the system using login requests. By sending large numbers of login requests, the system can be made non-responsive to valid user logins.

Figure 7:
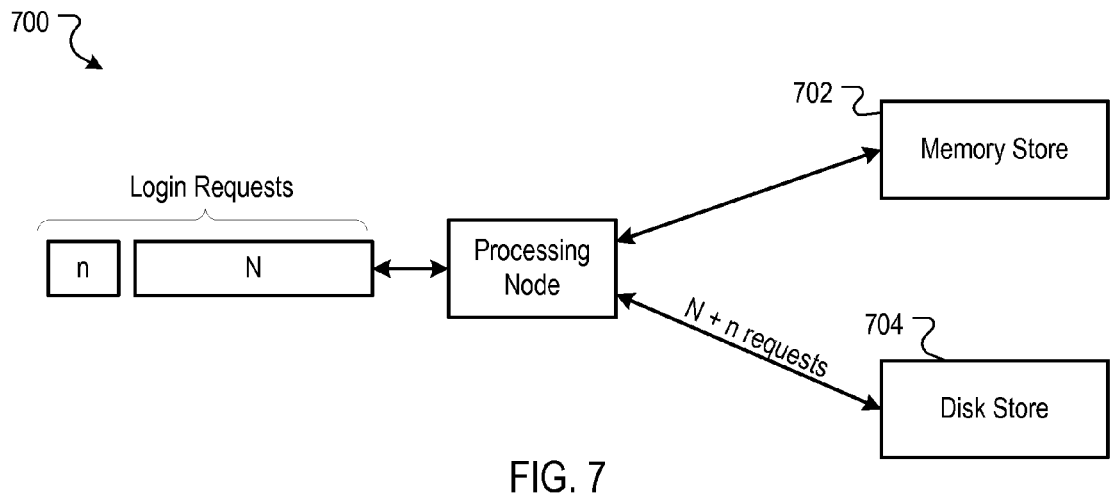
FIG. 7 is a block diagram of an example system having a user base with a volume of credential data much larger than that which can be stored in main memory.

FIG. 7 is a block diagram of an example system 700 having a user base with a volume of credential data much larger than can be stored in main memory. The user credential data does not fit in the memory store 702 (e.g., random access memory of a server device), so the data is stored in the disk store 704. Causing repeated requests for such access, an attacker can significantly reduce the system throughput, or even deny service to others.

For example, for a system that can process r requests per second while using disk store, a link capacity of the system can permit the system to receive R requests per second where R is much larger than r. The system under attack thus experiences a sustained backlog of (R−r) requests per second. This increases the memory pressure on the system having to queue the backlog, and the system eventually drops requests due to memory exhaustion.

Figure 8:
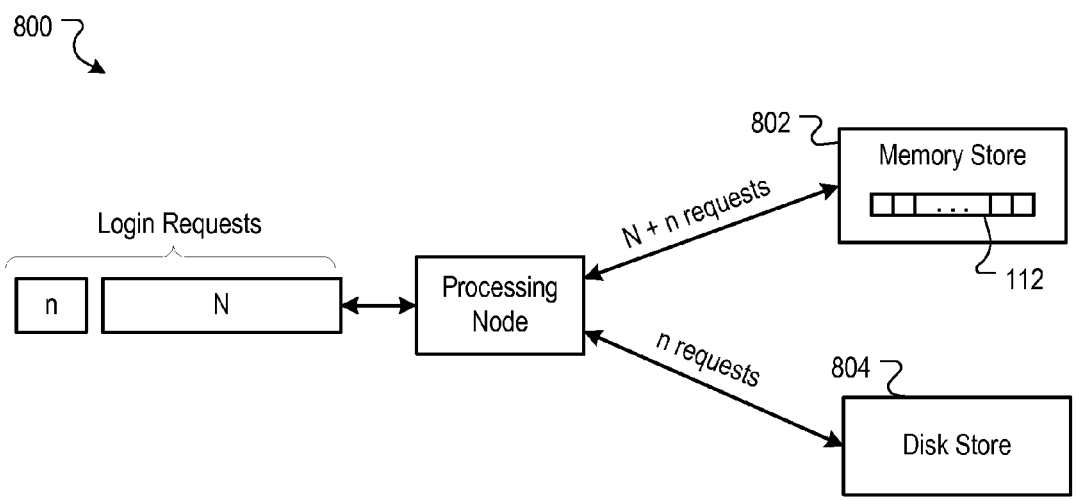
FIG. 8 is a block diagram of an example system having a user base with a volume of credential data much larger than can be stored in main memory and user absence information stored in a guard table.

FIG. 8 is a block diagram of an example system 800 having a user base with a volume of credential data much larger than can be stored in main memory and user absence information stored in a guard table 112. The memory required to store the guard table 112 is significantly smaller than the credentials and can fit in main memory (e.g., transistor based random access memory). The system 800 significantly reduces, disk accesses for login attempts that correspond to the N fraudulent requests of the DOS attack. Both the N fraudulent and the n genuine requests are processed using the presence information in the guard table 112 stored in the memory store 802, but only those requests that are found to correspond to valid user credentials (as indicated by a guard table) are processed further using the disk store 804. Some of the N requests may be lead to disk accesses where collisions occur, but these do not significantly affect the performance of the system.

In some implementations, processing nodes 110 can then be configured to begin ignoring traffic from IP addresses that are the source for a threshold number requests that are indicated to be fraudulent by checking a guard table.

Propagation of Updated Guard Table Information Across a Network Security System

Figure 9:
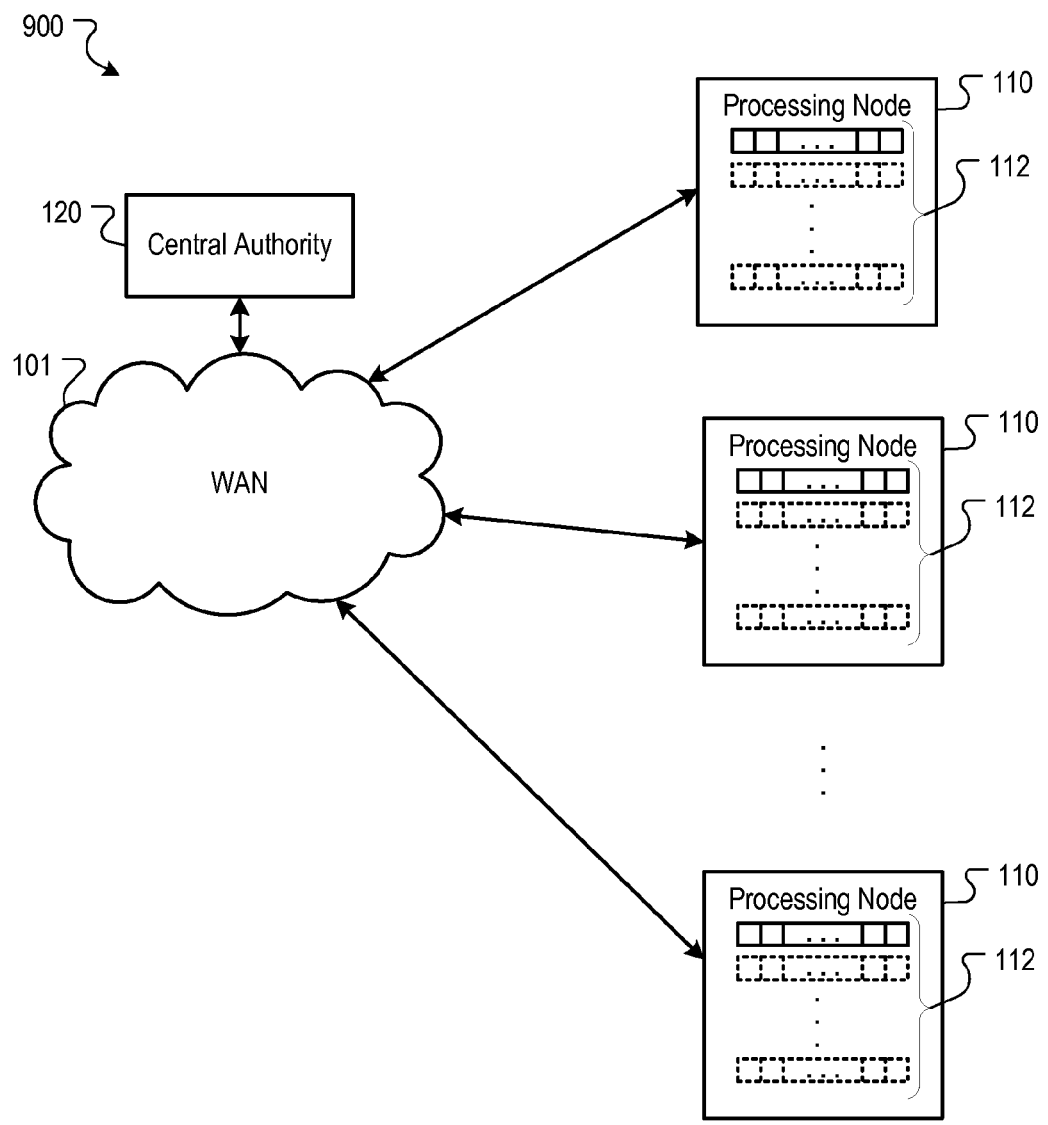
FIG. 9 is a block diagram of an example network environment of a network security system.

FIG. 9 is a block diagram of an example network environment 900 of a network security system. The network security system includes a number of processing nodes 110 than can be, for example, configured to balance processing loads across the nodes. A central authority server 120 can include security policies that are distributed to the processing nodes 110 for enforcement. In some implementations, the processing nodes are geographically distributed to serve geographically proximate users. In some implementations, the processing nodes are grouped in one or more "server farm" locations.

The processing nodes include one or more guard tables 112. In some implementations, upon the update of a datastore or other stored records (the querying of which are protected by a guard table), the processing node 110 that is processing the operation and/or a processing node 110 that is assigned to or otherwise associated with a server performing the update operation updates a corresponding guard table stored at the processing node 110. That processing node 110 can then forward information for performing the update to a central authority server 120. The information for performing the update can include, for example, the complete updated guard table; an identifier identifying the guard table to be updated, a bit position to be set; the information key corresponding to the updated information; and/or other information. The central authority 120 can distribute the information for performing the update to other processing nodes 110.

In some implementations, a processing node 110 can send information for performing a guard table update to other processing nodes 110 in a peer-to-peer update operation.

Figure 10:
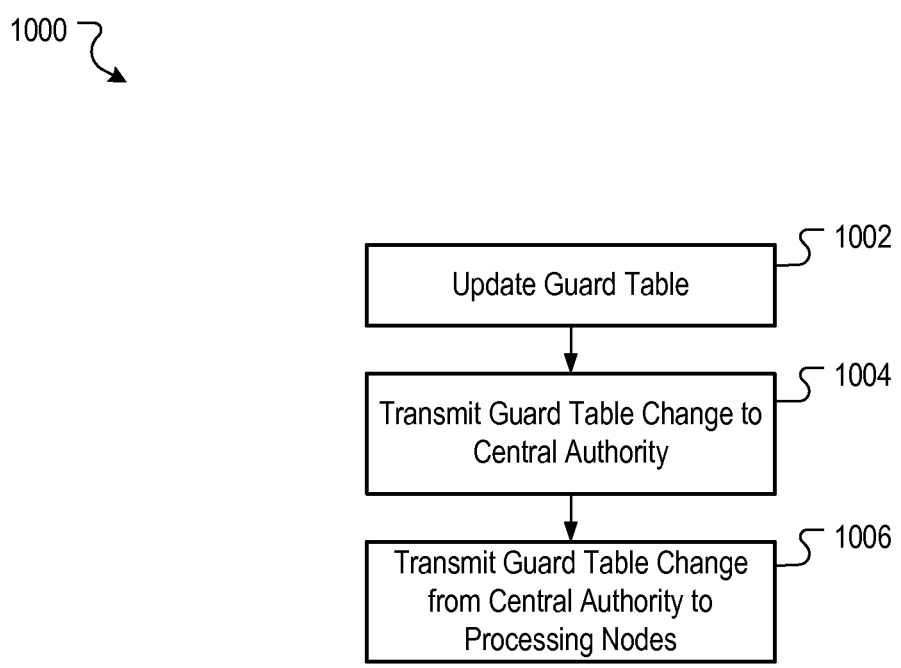
FIG. 10 is a flowchart of an example method for updating a guard table and transmitting updated guard table information in a network security system.

FIG. 10 is a flowchart of an example method 1000 for updating a guard table and transmitting updated guard table information in a network security system through a central authority. The guard table is updated (1002). For example, upon information being added to a datastore 114, a processing node 110 can extract or otherwise derive an information key from the added information, hash the key, and set a bit at a position indicated by the result of the hash to one.

The guard table change is transmitted to a central authority (1004). Transmitting the guard table change can include transmitting the updated guard table, or transmitting information for updating guard tables at other processing nodes. For example, the processing node 110 can transmit an updated guard table stored at the processing node 110 to the central authority server 120.

The guard table change is transmitted from the central authority to the other processing nodes (1006). For example, the central authority server 120 can transmit an updated guard table 112 received at the central authority server 110 to processing nodes 110 throughout a distributed network security system.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer implemented method comprising:
    hashing a plurality of keys derived from a respective plurality of records of a datastore, wherein the output of the hashing function is a plurality of bit positions;
    setting a plurality of bits at the bit positions in a guard table, wherein the guard table comprises a front end to the datastore comprising login information protected by a network security system;
    sending the guard table to a plurality of processing nodes, wherein the plurality of processing nodes comprise server computer devices;
    storing the guard table at the plurality of processing nodes;
    receiving a login request to access a network resource at a processing node;
    deriving a request key from the login request;
    hashing the request key with the hashing function, wherein the output of the hashing function is a candidate bit position;
    determining a value at the candidate bit position in the guard table of the processing node; and
    processing the login request based on the determined value at the candidate bit position thereby improving failure queries in the datastore, wherein the guard table represents negative information related to the login request and the datastore comprises positive information related to the login request such that the guard table limits processing of negative queries for the login request and the login request is only processed responsive to finding the candidate bit position in the guard table based on the request key.

2. The method of claim 1, wherein processing the data access request based on the determined value at the candidate bit position comprises processing the data access request only if the value at the bit position in the guard table indicates that information corresponding to the request key is present in the database.

3. The method of claim 1, wherein the request comprises a login request.

4. The method of claim 1, wherein the request comprises a file transfer request.

5. The method of claim 1, wherein the request comprises a request to access content at a uniform resource locator.

6. The method of claim 1, wherein the request comprises a request to access lightweight directory access protocol server information.

7. The method of claim 1, wherein the data access request is a file transfer request and processing the data access request based on the determined value at the candidate bit position comprises performing a virus scan of a file to be transferred if the value at the bit position in the guard table indicates that information corresponding to the request key is not present in the database.

8. The method of claim 1, wherein the data access request is a request to access content at a uniform resource locator and processing the data access request based on the determined value at the candidate bit position comprises performing a filter scan of content at the uniform resource locator if the value at the bit position in the guard table indicates that information corresponding to the request key is not present in the database.

9. A computer implemented method comprising:
receiving, at a processing node comprising a server computer device, a network file transmission request including at least one characteristic of the file to be transmitted;
hashing the at least one characteristic with a hashing function, wherein the output of the hashing function is a bit position, and wherein the at least one characteristic comprises file size and a checksum;
determining a value at the bit position in a guard table wherein the guard table comprises a front end to a datastore comprising information protected by a network security system and wherein the guard table is configured to improve failure queries in the datastore;
if the value at the bit position indicates that a threat detection test has not previously been performed on the file, initiating a threat detection test of the file;
if the value at the bit position indicates that threat detection test was previously performed on the file, checking test records to determine the result of the test; and
storing a result of the threat detection test in the datastore.

10. The method of claim 9, further comprising:
after the initiated threat detection test is complete, updating the guard table to generate an updated guard table by setting the value of the bit at the bit position to indicate that the file has been tested; and
transmitting the updated guard table to at least one other processing node.

11. The method of claim 9, further comprising:
if the file passes the initiated threat detection test, permitting the requested file transfer to proceed.

12. The method of claim 9, further comprising:
if the file fails the initiated threat detection test, denying the file transfer request.

13. The method of claim 9, further comprising:
if the test records indicate that the file has previously failed a threat detection test, denying the file transfer request.

14. The method of claim 9, further comprising:
if the test records indicate that the file has previously passed a threat detection test, permitting the file transfer request.

15. The method of claim 9, wherein the threat detection test is a virus scan.

16. A security system, comprising:
a plurality of processing nodes external to network edges of a plurality of enterprise systems, each processing node comprising a processing node guard table comprising a hash index of presence information for a plurality of information items, wherein the guard table comprises a front end to a datastore comprising login information protected by the security system, and wherein the guard table is configured to improve failure queries in the datastore; and
a central authority server including security policy information for an enterprise,
wherein at least one of the plurality of processing nodes is configured to:
update its respective guard table upon an information item being added to the datastore of the enterprise; and
transmit the updated guard table information to the central authority server, and
wherein the central authority server is configured to:
receive the updated guard table information; and
transmit the updated guard table information to at least one other processing node of the plurality of processing nodes;
wherein the guard table comprises negative information related to login requests and the datastore comprises positive information related to the login request such that the guard table limits processing of negative queries for a login request and the login request is only processed responsive to finding the candidate bit position in the guard table based on a request key.

17. The system of claim 16, where the at least one other processing node is configured to:
receive the updated guard table information; and
update a guard table of the at least one other processing node based on the updated guard table information.

18. The system of claim 16, wherein each of the processing node guard tables comprises negative information complementing positive information in the datastore.

19. The system of claim 16, wherein each of the processing node guard tables are organized hierarchically with each hierarchical level having a different hash function.

20. The system of claim 19, wherein at least one of the plurality of processing nodes is configured to:
determine a value at a candidate bit position in the guard table of the at least one of the plurality of processing nodes;
if the value is zero, performing no further action; and
if the value is one, checking another hierarchical level.

21. The system of claim 19, wherein each of the processing node guard tables comprises a three level table using cyclic redundancy check 64 (CRC64), MD5 Message-Digest Algorithm, and Checksum as indexing mechanisms.

22. The system of claim 16, wherein each of the processing node guard tables is configured to improve performance of failure queries in a worst case additional cost on an order of one saving on an order of m log m with m comprising a number of information records present.

* * * * *